United States Patent
Shu et al.

(10) Patent No.: US 6,310,347 B1
(45) Date of Patent: Oct. 30, 2001

(54) SPECTROMETER WITH PLANAR REFLECTIVE SLIT TO MINIMIZE THERMAL BACKGROUND AT FOCAL PLANE

(75) Inventors: Ker-Li Shu, Danbury; Peter R. Silverglate, Monroe, both of CT (US)

(73) Assignee: Goodrich Corporation, Charlotte, NC (US)

( * ) Notice: Subject to any disclaimer, the term of this patent is extended or adjusted under 35 U.S.C. 154(b) by 0 days.

(21) Appl. No.: 09/342,495

(22) Filed: Jun. 29, 1999

(51) Int. Cl.⁷ ..................................................... G01J 5/02
(52) U.S. Cl. ................... 250/339.07; 250/339.03
(58) Field of Search ........................ 250/339.03, 339.07

(56) References Cited

U.S. PATENT DOCUMENTS

| | | | | |
|---|---|---|---|---|
| 5,444,250 | * | 8/1995 | Hanke | 250/352 |
| 5,534,700 | * | 7/1996 | McGlynn et al. | 250/353 |
| 5,914,814 | * | 6/1999 | Ang | 359/565 |

\* cited by examiner

Primary Examiner—Constantine Hannaher
Assistant Examiner—Shun Lee
(74) Attorney, Agent, or Firm—James M. Rashid; Calfee, Halter & Griswold LLP

(57) ABSTRACT

An optical spectrometer system has a central axis, a detector having a detector surface disposed at one end of the system and located at a focal plane of the optical spectrometer system. A cold stop is associated with the detector for permitting entrance of target source radiation onto the detector surface while blocking background radiation from surroundings. A cooling device is coupled to the detector for cooling it and the cold stop to a predetermined low temperature. A flat plate is provided and has an spectrometer slit formed in it, the plate having a flat surface facing the detector, the flat surface being coated with a highly reflective, low emissivity material. Fore-optic focusing lenses or mirrors are located in front of the flat plate for focusing radiation onto the slit on the flat plate between the fore-optic focusing and the collimating lenses. The collimating lenses between the flat plate and the cold stop collimate the light from the slit and form a pupil at the cold stop. Both the fore-optic focusing lenses and the collimating lenses are designed such that the space between them is telecentric. This allows the use of an uncooled flat high reflective slit body that has very little self emission yet it does not reflect the background thermal radiation from the spectrometer cavity into the cold stop and impinge on the detector.

12 Claims, 2 Drawing Sheets

SPECTROMETER WITH PLANAR REFLECTIVE SLIT TO MINIMIZE THERMAL BACKGROUND AT FOCAL PLANE

This invention* was made with Government support under contract No. N66001-98-C-8607 awarded by the Department of the Navy, Naval Command, Control & Ocean Surveillance Center. The Government has certain rights in this invention.

BACKGROUND OF THE INVENTION

The present invention relates generally to optical infrared spectrometer systems, and more particularly, to an optical infrared spectrometer system that employs an entrance slit spaced telecentrically by locating the aperture stop at the back focal point of the collimating optics.

Prior art relating to the present invention includes dispersive optical infrared spectrometers that use for example, either prisms or gratings. Typically, a dispersive optical system has a detector and an imaging slit onto which the detector is focused, and is designed to operate within the infrared region of the optical spectrum. Because all warm objects emit infrared radiation, the slit body is cooled to minimize self emitted radiation which is seen by the detector as background noise. Cooling requires that the slit be placed in a vacuum that is connected to a cryogen source, both of which features are expensive.

Prior systems typically cool both the focal plane (detector) and the slit. In some systems, two vacuum dewars (double walled vacuum container) or one complex dewar incorporating the slit and the focal plane have typically been used. In other systems, one large or two smaller cryogenic coolers have been used to cool the slit and the focal plane. But, cryogenic systems that cool the entire spectrometer or, cool just the slit body and the detector, are very bulky. Cryogenic cooling must be accomplished by immersing the dewar in a large vat of liquid cryogen, such as, liquid nitrogen, or by attachment of a large, powerful mechanism such as a Stirling cycle cryogenic refrigerator. However this approach incurs severe penalties in terms of high cost, large size, large weight, high electric power requirements (for the Stirling mechanism) and maintainability requirements (supplying and filling liquid cryogen in field conditions). Furthermore, special materials and designs have also been required to maintain system alignment from room temperature down to operational temperature.

Some prior systems have used a low reflectivity, high emissivity, flat slit surround or body that introduces a small percentage of the radiation from the cavity wall. However, all of the in-field radiation from the slit body is imaged onto the focal plane detector. Another prior art system uses a high reflectivity, low emissivity flat slit body that reduces the self emission from the slit body and increases the reflection contribution from the cavity. These two embodiments require that the slit body or the cavity walls be cooled to minimize background effects. Instrumental thermal background is a severe problem in infrared spectrometers. It produces increased noise, decreased dynamic range, and may decrease radiometric accuracy. These effects are so undesirable that infrared spectrometers are often cooled to cryogenic temperatures to substantially reduce the thermal background. These issues render the use of sensitive infrared spectrometers for observations of the earth from airborne or satellite platforms difficult. A solution to this problem is described in U.S. Pat. No. 5,534,700. Here the slit is configured as a highly reflective, low emissivity optic (generally a toroid for most spectrometer designs) so that self thermal emission from the slit body would be nil and that thermal emission from the spectrometer cavity reflected from the slit body would impinge outside the active detector area. The need for cryogenic cooling of the entire spectrometer is eliminated, since the instrumental thermal background is substantially reduced. It is noted that self thermal emission from the slit body is nil and thermal emission from the spectrometer cavity reflected from the slit body impinges outside the active detector area. However a flat reflective slit body is far easier to fabricate.

The design in U.S. Pat. No. 5,434,700 thus does not require a toroidal slit body, which is extremely difficult and costly to fabricate to the required tolerances. If the spectrometer covers a very large field of view, as is highly desirable for most imaging infrared spectrometers, the required toroidal surface may be so steep as to be impossible to fabricate with the prevailing state of the art. The need for the toroidal slit body may be obviated if, in accordance with the invention, a spectrometer design is used that (a) makes the entrance slit space telecentric by locating the aperture stop at the back focus of the collimating optics, and (b) places the dispersive element (a grating or prism) at or close to the aperture stop. In so doing, all the chief rays in both the spatial and spectral fields are oriented parallel to the optical axis.

In sum, the system disclosed in U.S. 5,534,700 requires a toroidal slit body, which is extremely difficult and costly to fabricate to the required tolerances. If the spectrometer covers a very large field of view, as is highly desirable for most imaging infrared spectrometers, the required torroidal surface may be so steep as to be impossible to fabricate with the prevailing state of the art.

SUMMARY OF THE INVENTION

An optical spectrometer system has a central axis, a detector having a detector surface disposed at one end of the system and located at a focal plane of the optical spectrometer system. A cold stop is associated with the detector for permitting entrance of radiation from a target source onto said detector surface while blocking background radiation from surroundings. A cooling device is coupled to the detector for cooling it and the cold stop to a predetermined low temperature. A flat etched plate is provided and has a spectrometer slit formed in it, said plate having a face facing said detector, said face being coated with a highly reflective, low emissivity material. Spectrometer fore-optics focusing lenses or mirrors are located in front of the flat etched plate for focusing radiation onto said flat etched plate at the telecentric space of the fore-optics focusing lenses and the collimating lenses. The collimating lenses located between the flat etched plate and the cold stop collimate the light from the slit and form a pupil at the cold stop. A dispersion element is located at or near the cold stop to disperse the light toward the detector surface and a set of camera lenses is also provided to focus the light forming spectrum images onto the detector. A window provides the entrance to a vacuum cryogenic dewar which encloses and keeps the cold stop, the dispersion element, the focusing lenses and the detector at cryogenic temperature.

BRIEF DESCRIPTION OF THE PREFERRED EMBODIMENT

DETAILED DESCRIPTION OF THE INVENTION

Figure 1:
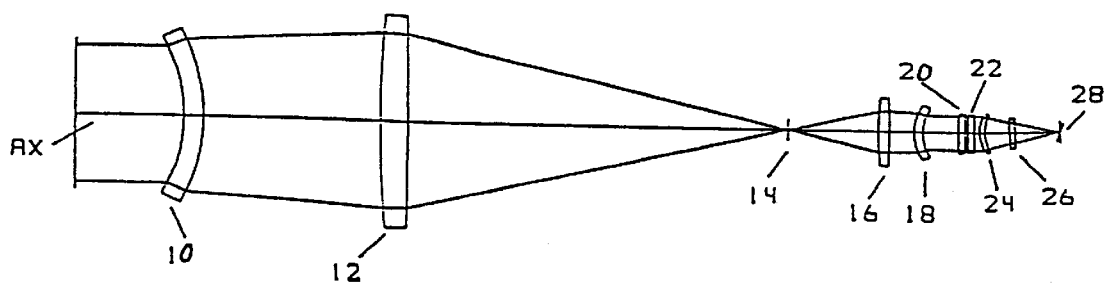
FIG. 1 is a schematic side elevation view of the optical spectrometer system of the invention.
Figure 2:
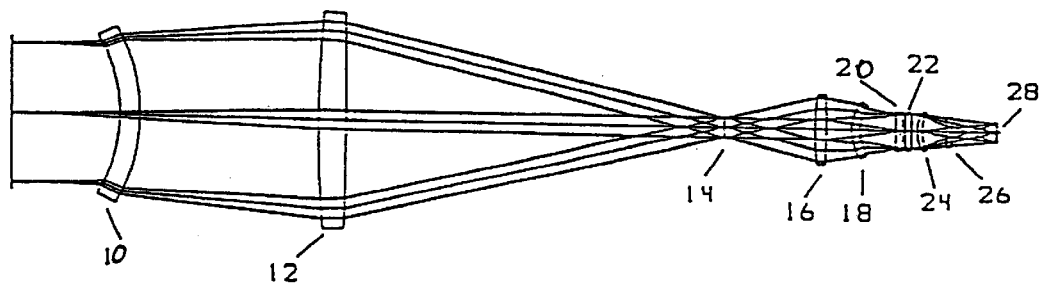
FIG. 2 is a schematic top plan view of the optical spectrometer system of the invention.

Referring now to FIGS. 1 and 2, it should be seen that the improved spectrometer design is comprised of a plurality of elements arranged along an axis AX. These elements include fore-optics focal lenses 10 and 12, an etched flat plate 14, collimating lenses 16 and 18, cryogenic dewar window 20, dispersion element cold stop 22, and camera lenses 24 and 26 focusing the image onto a focal plane detector surface 28.

Light is focused by the fore-optics lenses 10 and 12 acting as a telescope, onto the flat etched plate 14. The plate 14 has a slit formed in it. The collimating lenses 16 and 18, collimate the light passing through the slit. The fore-optics and the collimating lens are designed in such a way that the space between the fore-optics and the collimating lens is telecentric. This means that all chief rays are incident on the slit at normal angles. The telecentric nature of the spectrometer design renders it possible to use a flat reflective slit body surface as a retro-reflector. The detector in the cryogenic dewar looks out through the cold stop and upon reflection from the flat slit body surface will look back into the cold stop. Any thermal background radiation from outside the cold stop impinging on the flat slit body surface will not be reflected into the cold stop and reach the detector.

A pupil or the cold stop is provided on one side of the dispersion element 22. The dispersion element 22 is of the form of a prism or transmissive grating. Following the cold stop/dispersion element 22 are camera lenses which focus the light onto the focal plane 28 of the detector, producing a series of contiguous slit images dispersed into distinct spectral bands. The space between the cold stop 22 and the detector 28, and the elements therebetween, are cryogenically cooled and enclosed by the cryogenic dewar. A window 20 seals the dewar and provides an entrance for the optical beams entering the dewar. The interface between the dewar and the rest of the optical train is at the window and is in a collimated space. This renders the system insensitive to small x, y, and z motions of the dewar. These motions might be produced by vibration in an aircraft or spacecraft or by the cooler vibration or induced by temperature changes. The spectral images will remain sharp, in focus and stationary.

Figure 3:
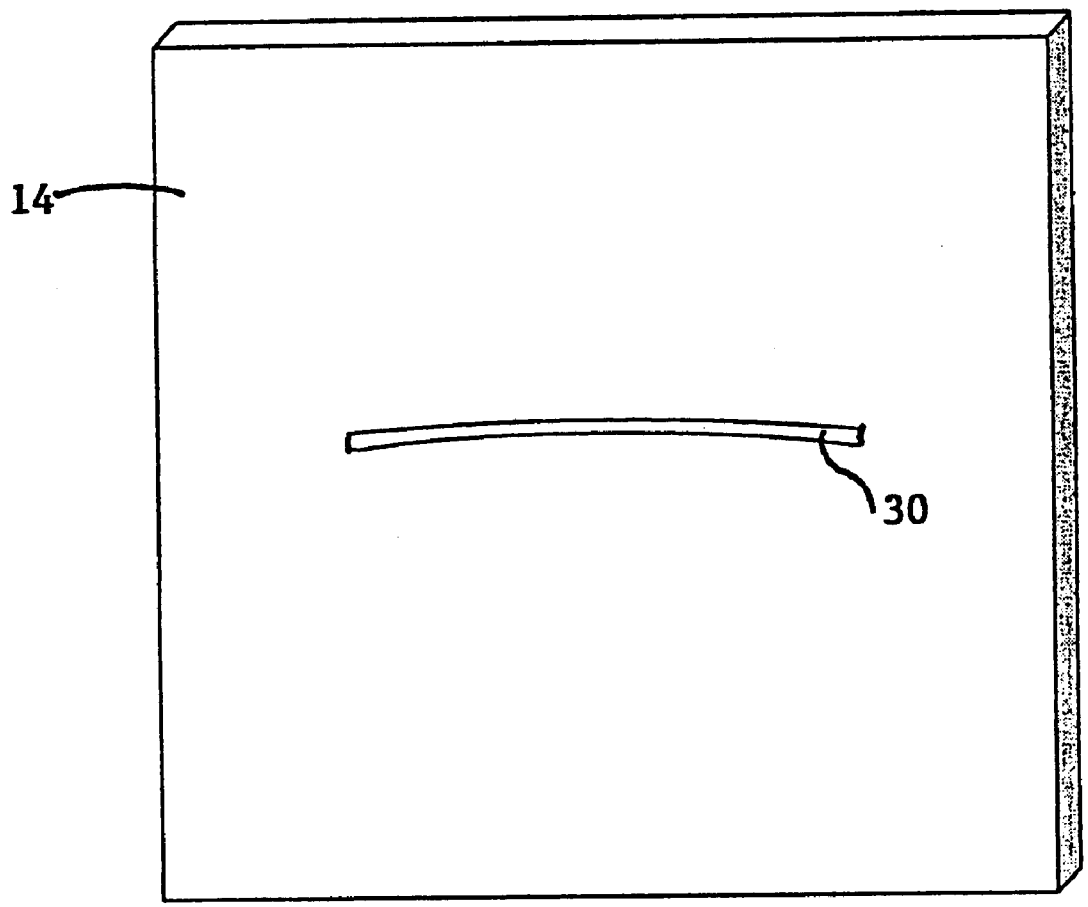
FIG. 3 is a sketch of a flat plate with a curved, elongated hole formed therein suitable for use in the optical spectrometer system of FIGS. 1 and 2.

Referring back to the slit formed in the plate 14, it should be seen from the sketch of FIG. 3 that this slit is a curved, elongated hole 30 cut or etched into the flat plate 14. The side of the plate facing the spectrometer is coated with a highly reflective, low emissivity material such as gold. The self emission of the slit is minuscule, and thermal emission from the spectrometer cavity reflected from the slit is imaged outside the active detector area. The thermal background emission is dominated by the emission from the transmissive lenses and dewar window, which can be made very small by anti-reflection coating the proper selection of the material.

Thus, the prior art need for the torroidal slit body is thus dispensed with if a spectrometer design is utilized which (a) makes the entrance slit space telecentric by locating the aperture stop at the back focus of the collimating optics, (b) places the dispersive element (a grating or prism) at or close to the aperture stop. In so doing, all the chief rays in both the spatial and spectral fields are then oriented parallel to the optical axis at the slit plane.

What is claimed is:

1. An optical spectrometer system having a central axis comprising:
    a detector having a detector surface disposed at one end of the system and located at a focal plane of the optical spectrometer system;
    a cold stop associated with the detector for permitting entrance of target source radiation onto said detector surface while blocking radiation from the surroundings;
    cooling means coupled to the detector for cooling the detector and the cold stop to a predetermined low temperature;
    a flat plate having a spectrometer slit formed therein, said plate having a flat surface facing said detector, said flat surface being coated with a highly reflective, low emissivity material;
    fore-optics means located in front of the flat plate for focusing radiation onto the slit at the flat plate at a telecentric space between the fore-optics means and collimating lenses, said collimating lenses being located between the flat plate and the cold stop for collimating light from the slit and forming a pupil at the cold stop; and
    a dispersion element associated with said cold stop for dispersing light toward said detector surface.

2. The optical apparatus of claim 1 wherein the slit is formed in the flat plate as a curved elongated hole.

3. The optical apparatus of claim 2 wherein said dispersion element is provided after said collimating lenses proximate said cold stop.

4. The optical apparatus of claim 3 wherein said flat surface is coated with gold.

5. The optical apparatus of claim 4 wherein the space between the detector to the cold stop are cryogenically cooled.

6. The optical apparatus of claim 1 wherein said fore-optics means includes focusing lenses.

7. The optical apparatus of claim 1 wherein said dispersion element includes a transmissive grating.

8. The optical apparatus of claim 1 wherein the slit is etched through the flat plate.

9. In an optical spectrometer system having a central axis, said system comprising:
    a detector having a detector surface disposed at one end of the system and located at a focal plane of the optical spectrometer system;

a cold stop associated with the detector for permitting entrance of target source radiation onto said detector surface while blocking background radiation from the surroundings;

cooling means coupled to the detector for cooling the detector and the cold stop and all elements therebetween to a predetermined low temperature;

a flat plate having a spectrometer slit formed therein, said plate having a flat surface facing said detector, said flat surface being coated with a reflective, low emissivity material;

fore-optics means located in front of the flat plate for focusing radiation onto the slit at the flat plate at a telecentric space between said fore-optics means and collimating lenses, the collimating lenses being located between the flat plate and the cold stop to collimate the light from the slit and form a pupil at the cold stop; and wherein the space from the detector to the cold stop are cryogenically cooled.

10. The optical apparatus of claim 9 wherein the slit is formed in the flat plate as a curved elongated hole and said flat surface being coated with gold.

11. The optical apparatus of claim 10 wherein a dispersion element is provided after said collimating lenses and near or at said cold stop.

12. The optical apparatus of claim 9 wherein the slit is etched through the flat plate.

* * * * *